United States Patent [19]
Bos et al.

[11] Patent Number: 5,912,873
[45] Date of Patent: *Jun. 15, 1999

[54] COMPACT DISC TRANSPORTER WITH DUAL TRANSPORT SITES

[75] Inventors: Eric Rene Bos, Fountain Valley; Robert L. Montelius, Jr., Laguna Hills; Richard J. Denning, Westminster, all of Calif.

[73] Assignee: Multidisc Technologies, Huntington Beach, Calif.

[*] Notice: This patent is subject to a terminal disclaimer.

[21] Appl. No.: 08/877,789

[22] Filed: Jun. 18, 1997

[51] Int. Cl.⁶ .................................................. G11B 17/18
[52] U.S. Cl. .............................. 369/178; 369/36; 369/204
[58] Field of Search .............................. 369/34, 36, 77.1, 369/178, 191, 192, 204, 258, 263; 360/92, 98.04; 294/86.4; 901/39; 414/225, 226, 277, 281, 282, 283, 751, 753

[56] References Cited

U.S. PATENT DOCUMENTS

| | | |
|---|---|---|
| 1,858,396 | 5/1932 | Fey . |
| 4,527,262 | 7/1985 | Manto ........................................ 369/33 |
| 4,567,584 | 1/1986 | Kawakami ................................. 369/38 |
| 4,589,101 | 5/1986 | Schatteman et al. ...................... 369/38 |
| 4,607,354 | 8/1986 | Ishibashi et al. .......................... 369/39 |
| 4,614,474 | 9/1986 | Sudo ........................................ 414/281 |
| 4,664,454 | 5/1987 | Schatteman et al. ...................... 312/13 |
| 4,682,320 | 7/1987 | D'Alayer De Costemore D'Arc .. 369/77.1 |
| 4,701,899 | 10/1987 | D'Alayer De Costemore D'Arc .. 369/ |

(List continued on next page.)

FOREIGN PATENT DOCUMENTS

| | | |
|---|---|---|
| 66317B1 | 12/1982 | European Pat. Off. . |
| 284445A1 | 9/1988 | European Pat. Off. . |
| 288165A2 | 10/1988 | European Pat. Off. . |
| 516496A2 | 12/1992 | European Pat. Off. . |
| 542482 | 5/1993 | European Pat. Off. . |
| 550282A2 | 7/1993 | European Pat. Off. . |
| 589479A2 | 3/1994 | European Pat. Off. . |
| 662687A1 | 7/1995 | European Pat. Off. . |
| 779619A2 | 6/1997 | European Pat. Off. . |
| 2 538 597 | 6/1984 | France . |
| 60-106250 | 7/1985 | Japan . |
| 4-310367 | 11/1992 | Japan . |
| 4-341968 | 11/1992 | Japan . |
| 6-84265 | 3/1994 | Japan . |
| 6-195838 | 7/1994 | Japan . |
| 2286715 | 8/1995 | United Kingdom . |

*Primary Examiner*—William R. Korzuch
*Attorney, Agent, or Firm*—Stetina Brunda Garred & Brucker

[57] ABSTRACT

A compact disc loader and transport apparatus for placement within a compact disc storage magazine structure for transporting selected discs. The magazine structure includes a movement mechanism for movement of the loader and transport apparatus between storage shelves and drive mechanisms for retrieval and delivery of discs. The loader and transport apparatus has two laterally adjacent disc transport positions each including a plurality of disc engagers for cooperative frictional engagement of a disc presented thereto at at least two edge sites of the disc. Each disc engager is mounted at a periphery site of a respective motor driven rotatable platform whose rotation in cooperation with the rotation of at least one other platform moves the disc from or to a disc transport position of the loader and transport apparatus or between disc transport positions thereof. The loader and transport apparatus can then travel for delivery and/or further disc retrieval at another storage shelf or drive mechanism. It is preferred that the loader and transport apparatus have opposing openings through either of which a disc can be made to proceed. Lateral movement of a disc from one transport position to the other permits placement of such a disc within storage shelves adjacent each other or directly or indirectly opposing each other. Delivery and/or retrieval of two discs can occur simultaneously from and/or to adjacent sites to thereby enhance time-factor performance.

4 Claims, 6 Drawing Sheets

U.S. PATENT DOCUMENTS

36

| | | | |
|---|---|---|---|
| 4,734,814 | 3/1988 | Fujino et al. | 360/133 |
| 4,754,397 | 6/1988 | Varaiya et al. | 364/200 |
| 4,817,070 | 3/1989 | Hug et al. | 369/36 |
| 4,839,758 | 6/1989 | Honjoh | 360/99.06 |
| 4,853,916 | 8/1989 | Tomita | 369/36 |
| 4,855,980 | 8/1989 | Hug et al. | 369/36 |
| 4,891,720 | 1/1990 | Grant et al. | 360/92 |
| 4,912,575 | 3/1990 | Shiosaki | 360/71 |
| 4,945,430 | 7/1990 | Konishi et al. | 360/92 |
| 4,969,140 | 11/1990 | Koiwa et al. | 369/77.1 |
| 4,979,160 | 12/1990 | Araki | 369/191 X |
| 4,988,038 | 1/1991 | Mitsuyama | 229/1.5 R |
| 5,001,582 | 3/1991 | Numasaki | 360/98.06 |
| 5,020,043 | 5/1991 | Kohler | 369/36 |
| 5,022,019 | 6/1991 | Motovoshi et al. | 369/36 |
| 5,036,503 | 7/1991 | Tomita | 369/36 |
| 5,041,929 | 8/1991 | Fryberger et al. | 360/92 |
| 5,045,958 | 9/1991 | Leonard et al. | 360/92 |
| 5,056,077 | 10/1991 | Morikawa et al. | 369/77.1 |
| 5,058,100 | 10/1991 | Yoshii | 369/291 |
| 5,064,069 | 11/1991 | Su | 206/425 |
| 5,067,116 | 11/1991 | Kadrmas | 369/37 |
| 5,091,898 | 2/1992 | Bessho et al. | 369/77.2 |
| 5,128,912 | 7/1992 | Hug et al. | 369/38 |
| 5,136,562 | 8/1992 | Staar | 369/36 |
| 5,146,451 | 9/1992 | Kang | 369/270 |
| 5,161,682 | 11/1992 | Seifert et al. | 206/309 |
| 5,173,894 | 12/1992 | Kido | 369/77.1 |
| 5,187,695 | 2/1993 | Schindler et al. | 369/37 |
| 5,189,656 | 2/1993 | Masaki et al. | 369/47 |
| 5,191,983 | 3/1993 | Hardy | 211/40 |
| 5,195,066 | 3/1993 | Amemiya et al. | 369/32 |
| 5,197,056 | 3/1993 | Van Heusden et al. | 369/37 |
| 5,206,845 | 4/1993 | Baxter et al. | 369/34 |
| 5,210,728 | 5/1993 | Noguchi et al. | 369/36 |
| 5,214,628 | 5/1993 | Langman et al. | 369/37 |
| 5,216,645 | 6/1993 | Sakayama | 369/36 |
| 5,218,583 | 6/1993 | Miyajima | 369/36 |
| 5,228,016 | 7/1993 | Menke | 369/36 |
| 5,235,579 | 8/1993 | Ross | 369/37 |
| 5,247,500 | 9/1993 | Miyoshi et al. | 369/38 |
| 5,255,251 | 10/1993 | Fitzgerald et al. | 369/36 |
| 5,255,255 | 10/1993 | Kaneda et al. | 369/77.1 |
| 5,267,225 | 11/1993 | Fukasawa et al. | 369/36 |
| 5,274,620 | 12/1993 | Sipos | 369/77.2 |
| 5,285,333 | 2/1994 | Barr et al. | 360/92 |
| 5,289,441 | 2/1994 | Domberg et al. | 369/34 |
| 5,327,412 | 7/1994 | Lee | 369/75.2 |
| 5,370,243 | 12/1994 | Rosario | 211/40 |
| 5,373,489 | 12/1994 | Sato et al. | 369/36 |
| 5,429,470 | 7/1995 | Nicol et al. | 414/331 |
| 5,431,520 | 7/1995 | Brugger | 414/277 |
| 5,473,585 | 12/1995 | Kim | 369/36 |
| 5,481,514 | 1/1996 | Yamasaki et al. | 369/36 |
| 5,513,156 | 4/1996 | Hanaoka et al. | 369/34 |
| 5,539,712 | 7/1996 | Menke et al. | 369/36 |
| 5,544,148 | 8/1996 | Nakamichi | 369/192 |
| 5,546,366 | 8/1996 | Dang | 369/36 |
| 5,548,567 | 8/1996 | Sawai | 369/36 |
| 5,561,658 | 10/1996 | Nakamichi et al. | 369/263 |
| 5,610,882 | 3/1997 | Dang | 369/36 |
| 5,638,347 | 6/1997 | Baca et al. | 369/34 |
| 5,715,948 | 2/1998 | Hung | 211/40 |
| 5,720,386 | 2/1998 | Allsop et al. | 206/308.1 |

COMPACT DISC TRANSPORTER WITH DUAL TRANSPORT SITES

FIELD OF THE INVENTION

This invention relates in general to computer data retrieval from compact discs, and in particular to retrieving and delivering compact discs within a storage magazine structure with a compact disc loader and transport apparatus having two adjacent disc transport positions each having a plurality of disc engagers each mounted at a periphery site of one respective motor driven rotatable platform for frictional rotational engagement of a compact disc presented thereto at edge sites of the disc to thereby move the disc from or to the loader and transport apparatus or between transport positions within the loader and transport apparatus.

BACKGROUND OF THE INVENTION

Compact disc storage and retrieval has become a significant factor for consideration in view of the proliferation of use of these discs for data storage in association with computerized information that must be readily available. While individual discs are capable of accepting relatively large amounts of data, the amount of data stored for many applications is immense and therefore requires a significant number of discs. In addition to requiring large data storage capacity, rapid retrieval of discs is also desired so that data from the discs can be accessed more quickly.

One major factor in determining the efficiency of disc retrieval and delivery is found in the capabilities of the disc loader and transport apparatus that travels among disc storage sites and drive mechanisms to accomplish disc movement to and from such storage sites and drive mechanisms. Specifically, if the loader and transport apparatus is able to quickly retrieve, carry and deliver a disc, data from that disc can be made available forthwith. If the loader and transport apparatus additionally is able to serve opposing disc storage banks of a magazine structure by having opposing openings thereto, efficiency improves more vividly. Finally, if a single loader and transport apparatus is able to serve disc storage banks that are situated in a lateral spatial relationship, a two-fold increase in delivery and retrieval efficiency can be realized. Thus, it is apparent that a need is present for a disc loader and transport apparatus that can retrieve and deliver discs in a timely manner. Accordingly, a primary object of the present invention is to provide a compact disc loader and transport apparatus for placement within a compact disc storage magazine structure wherein the loader and transport apparatus comprises two laterally adjacent disc transport positions each having a plurality of disc engagers for frictional engagement of a compact disc presented thereto at edge sites of the disc to thereby move the disc from or to the loader and transport apparatus or between disc transport positions.

Another object of the present invention is to provide a compact disc loader and transport apparatus wherein each disc engager is mounted at a periphery site of a respective rotatable platform, with each disc transport position having four rotatable platforms situated to form four quadrants and four resulting disc engagers.

Yet another object of the present invention is to provide a compact disc loader and transport apparatus wherein each of the disc transport positions has two opposing openings through either of which a disc can be made to proceed by the disc engagers through movement of the rotatable platforms as such a disc travels between the loader and transport apparatus and a storage shelf or a disc drive mechanism.

These and other objects of the invention will become apparent throughout the description thereof which now follows.

SUMMARY OF THE INVENTION

The present invention is a compact disc loader and transport apparatus for placement within a compact disc storage magazine structure for transporting selected compact discs, with the magazine structure including a movement mechanism for movement of the loader and transport apparatus between disc storage shelves and one or more drive mechanisms for retrieval and delivery of discs. In particular, the loader and transport apparatus comprises two laterally adjacent disc transport positions each comprising a plurality of disc engagers for cooperative frictional rotational engagement of a compact disc presented thereto at at least two edge sites of the disc. Each disc engager is mounted at a periphery site of a respective motor driven rotatable platform whose rotation in cooperation with the rotation of at least one other platform moves the disc from or to a disc transport position of the loader and transport apparatus or between disc transport positions thereof and thereafter cease rotation.

In a preferred embodiment, one respective freely rotatable disc engager is mounted at a periphery site of each of four rotatable platforms that are situated to form four quadrants to thereby provide each quadrant with one disc engager. Each disc transport position is constructed in this manner such that each of one or two discs can be held by four disc engagers. It is preferred that each disc transport position have opposing openings through either of which a disc can be made to proceed by the disc engagers through movement of the rotatable platforms. Such construction effectuates service to opposing disc storage shelves of the magazine structure by a single loader and transport apparatus as the loader and transport apparatus travels among storage shelves and one or more disc drive mechanisms. Additionally, lateral movement of a disc from one transport position to the other permits placement of such a disc within disc storage shelves adjacent each other or directly or indirectly opposing each other. Because the disc loader and transport apparatus of the present invention can accommodate two discs concurrently, it is apparent that delivery and/or retrieval of two discs can occur simultaneously from and/or to adjacent storage or drive mechanism sites, thereby enhancing time-factor performance and ultimate timely data recovery from the selected compact discs.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
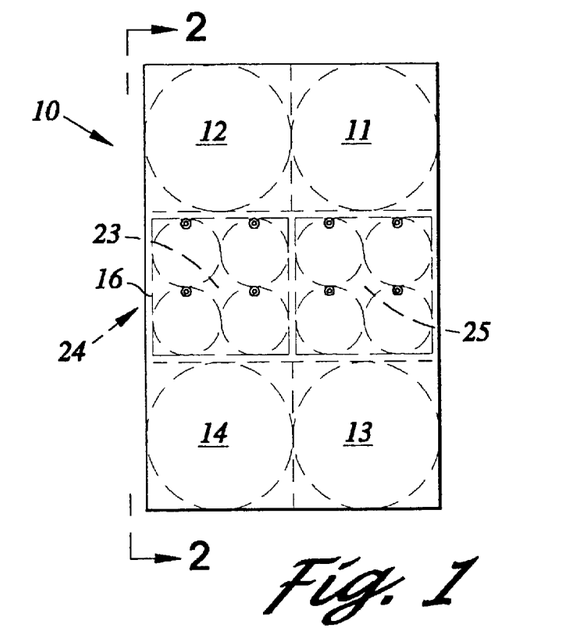
FIG. 1 is a schematic illustration of a top plan view of a computer compact disc storage magazine structure with a disc loader and transport apparatus.
Figure 2:
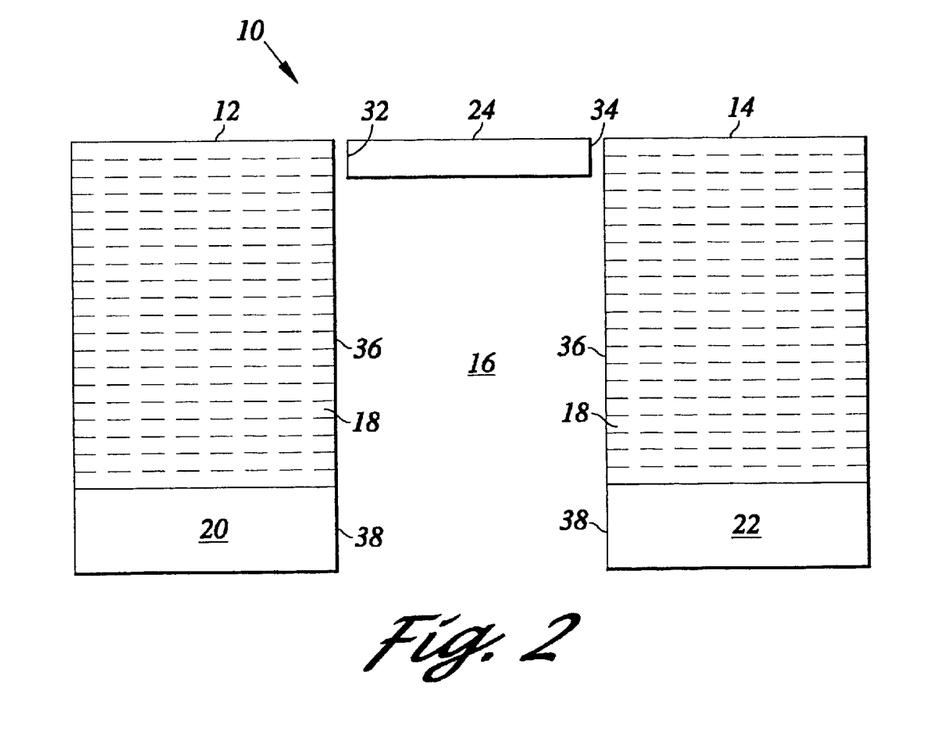
FIG. 2 is an enlarged schematic illustration of a side elevation view of the storage site and loader and transport apparatus along line 2—2 of FIG. 1.

Referring to FIG. 1, a disc storage magazine structure 10 having four storage banks 11, 12, 13, 14 with an access channel 16 therewithin is shown. As shown in FIG. 2, each storage bank 11, 12, 13, 14 (storage banks 12 and 14 only are shown in FIG. 2) has a plurality of storage shelves 18 each able to accommodate one compact disc for storage, with each shelf 18 having an opening 36. Situated at the base of each storage bank 11, 12, 13, 14 is a disc drive mechanism 20 each having a respective opening 38 through which a disc can pass, and capable of retrieving data from a disc as known in the art. Disposed within the access channel 16 is a loader and transport apparatus 24 as shown in FIG. 1 having two identical disc transport positions or units 23, 25 for retrieving, transporting and delivering compact discs among the storage banks 11, 12, 13, 14 and disc drive mechanisms 20.

Figure 3:
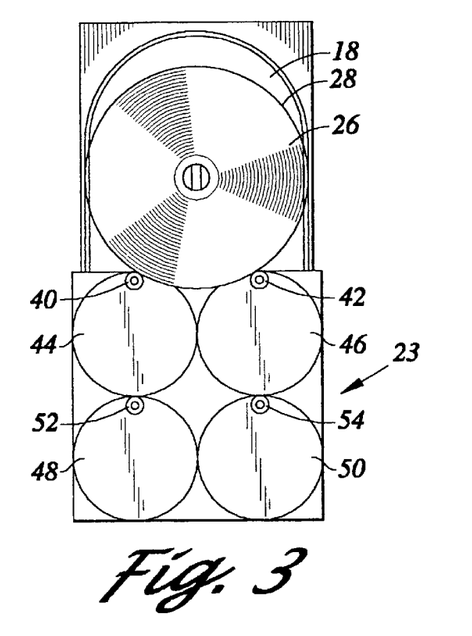
FIG. 3 is a schematic illustration of a top plan view of a disc storage shelf and one disc transport position of the disc loader and transport apparatus.
Figure 4A:
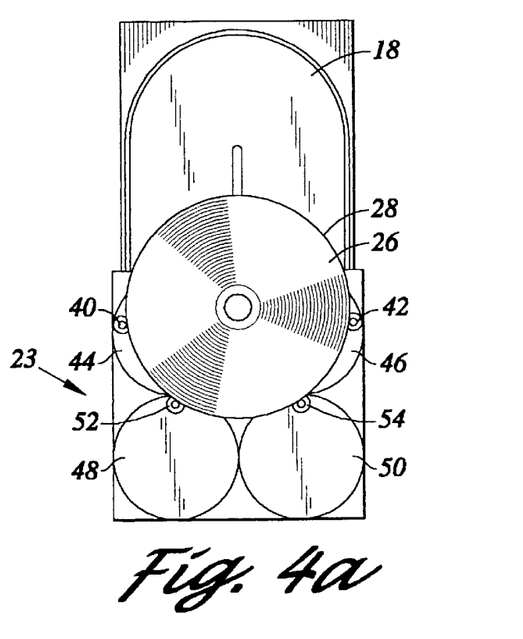
FIGS. 4a–4d are schematic illustrations of respective top plan views of one disc transport position of the disc loader and transport apparatus in sequence as a compact disc is loaded therein.
Figures 4B, 4D:
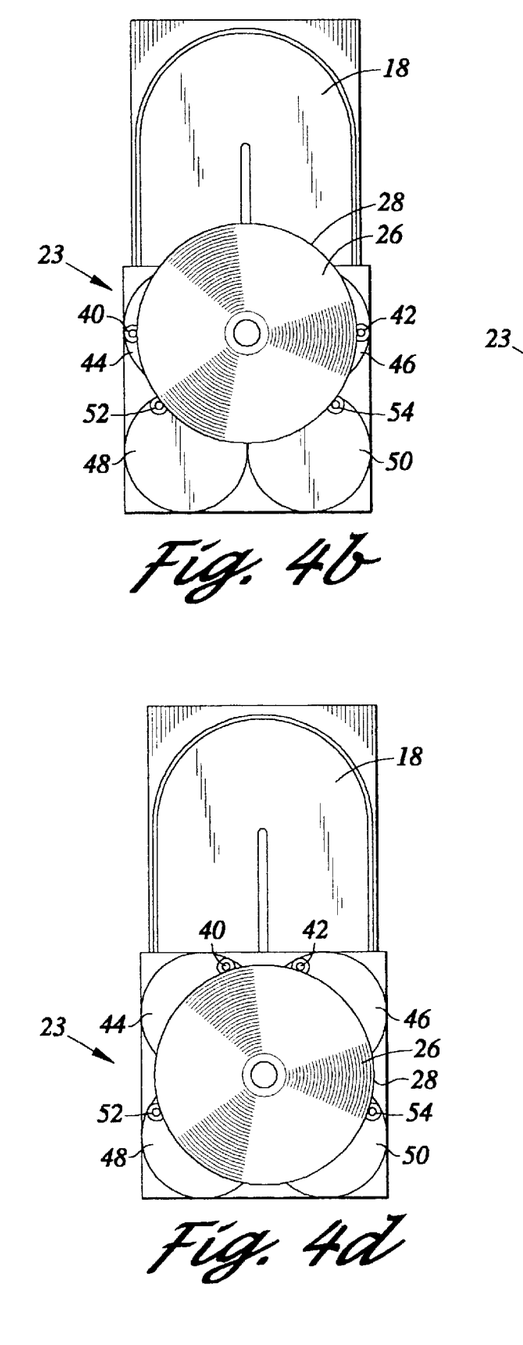
Figure 4C:
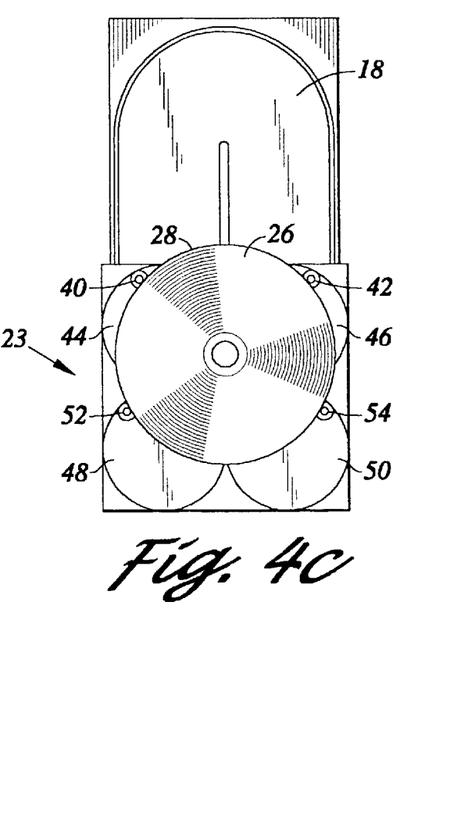

FIGS. 3–4d show a top plan view of one storage shelf 18 and one disc transport position 23 of the loader and transport apparatus 24. The shelf 18 is meant to be representative of any such shelf known in the art having a disc movement mechanism (not shown) capable of moving a disc 26 outwardly through the opening 36. As shown in FIG. 3, the disc 26 has been moved a short distance from the storage site of the shelf 18 through the opening 32 of the disc transport position 23 of the loader and transport apparatus 24 where two sites of the edge 28 of the disc 26 are frictionally engaged by two respective freely rotatable disc engager wheels 40, 42 disposed at the peripheries of cooperative respective motor driven rotatable platforms 44, 46 of the disc transport position 23 of the loader and transport apparatus 24. Two additional motor driven rotatable platforms 48, 50 complete a quadrant configuration of four platforms within the disc transport position 23, with the additional platforms 48, 50 each also having a respective peripherally mounted freely rotatable disc engager wheel 52, 54 for frictional engagement of the edge 28 of the disc 26.

Figure 5:
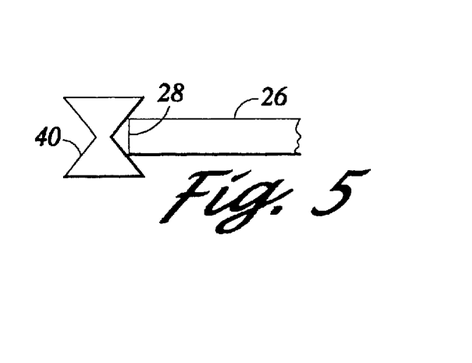
FIG. 5 is a side elevation view of a disc engager of the disc loader and transport apparatus and a portion of a compact disc.

FIGS. 4a–4d show the progression of disc retrieval by the disc transport position 23 of the loader and transport apparatus 24 until, as shown in FIG. 4d, the disc 26 is completely retained by respective wheels 40, 42, 52, 54. As illustrated in FIG. 5, each wheel 40, 42, 52, 54 is substantially hour-glass shaped, with the central portion 56 of each frictionally engaged with the edge 28 of the disc 26. While the illustration of FIGS. 4a–4d show retrieval of a disc 26 through the opening 32 of the disc transport position 23 of the loader and transport apparatus 24, it is apparent that retrieval of a disc 26 can likewise occur through the opposing opening 34 from the storage bank 14.

Figure 6A:
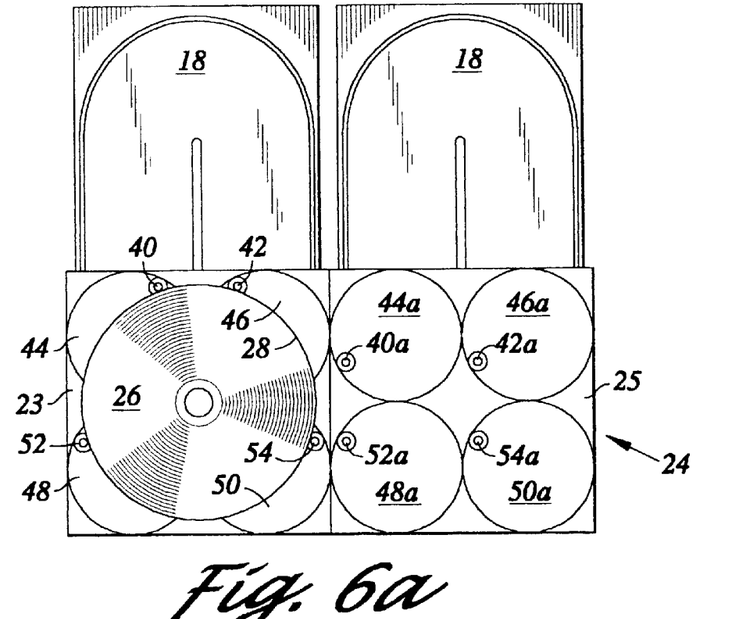
FIGS. 6a–6e are schematic illustrations of respective top plan views of the disc loader and transport apparatus in sequence as a compact disc is moved from one disc transport position of the apparatus to the other disc transport position thereof.
Figure 6B:
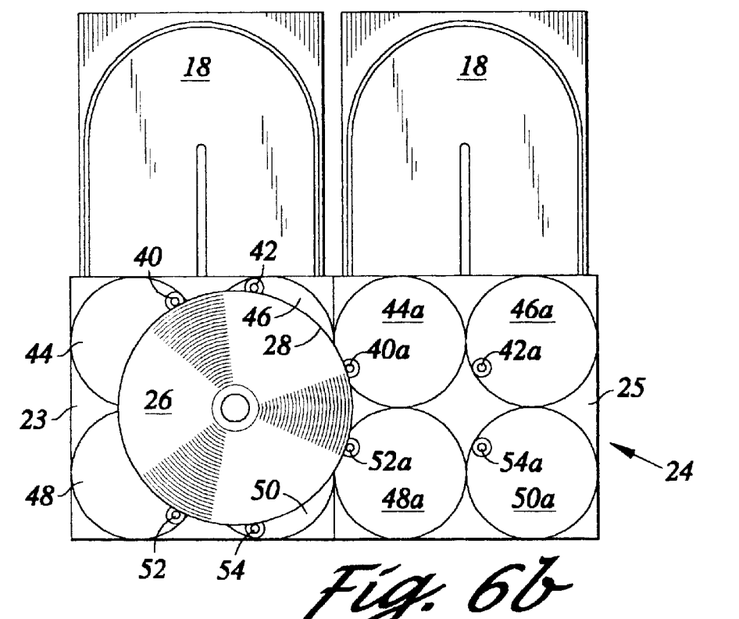
Figure 6C:
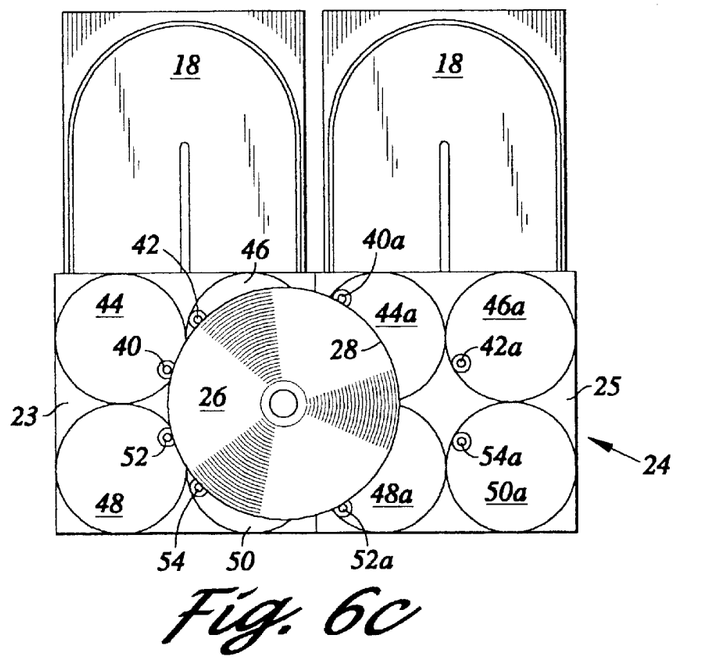
Figure 6D:
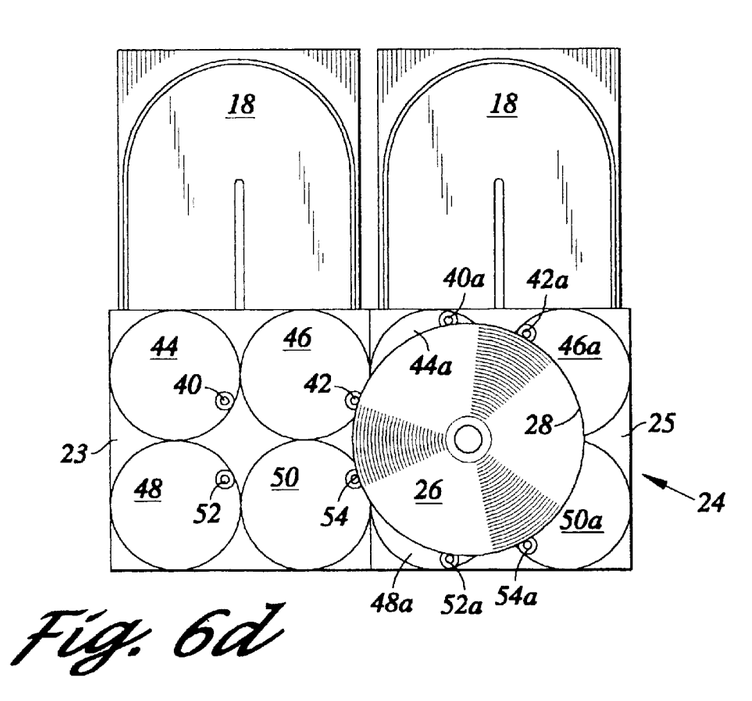

FIGS. 6a–6e show the loader and transport apparatus 24 in its entirety, with both disc transport positions 23, 25 shown in relation to each other and with two adjacent shelves 18 likewise illustrated. FIG. 6a replicates the configuration of disc transport position 23 of the loader and transport apparatus 24 as shown in FIG. 4d, with the disc 26 completely retained therein. As earlier noted, adjacent disc transport positions 23 and 25 of the loader and transport apparatus 24 are identical, and both therefore are capable of accepting and delivering a disc 26 in a manner as described above. In addition, a disc 26 can be moved by the mechanism of one disc transport position to be accepted by the mechanism of the other disc transport position as illustrated in FIGS. 6b–6e. Thus, as shown in FIGS. 6b–6e, rotating wheels 40, 42, 52 and 54 are engaged with the periphery 28 of the disc 26. Rotation of the platforms 44, 46, 48 and 50, moves the disc 26 to be initially in engagement contact with rotating wheels 40a and 52a (FIGS. 6b and 6c) of subsequently rotated platforms 44a and 48a. Continued movement of the disc 26 by rotation of the platforms 44a, 46a, 48a, 50a brings its periphery 28 in engagement contact with rotating wheels 42a and 54a or subsequent retention of the disc 26 in the second disc transport position 25 of the loader and transport apparatus 24.

Figure 6E:
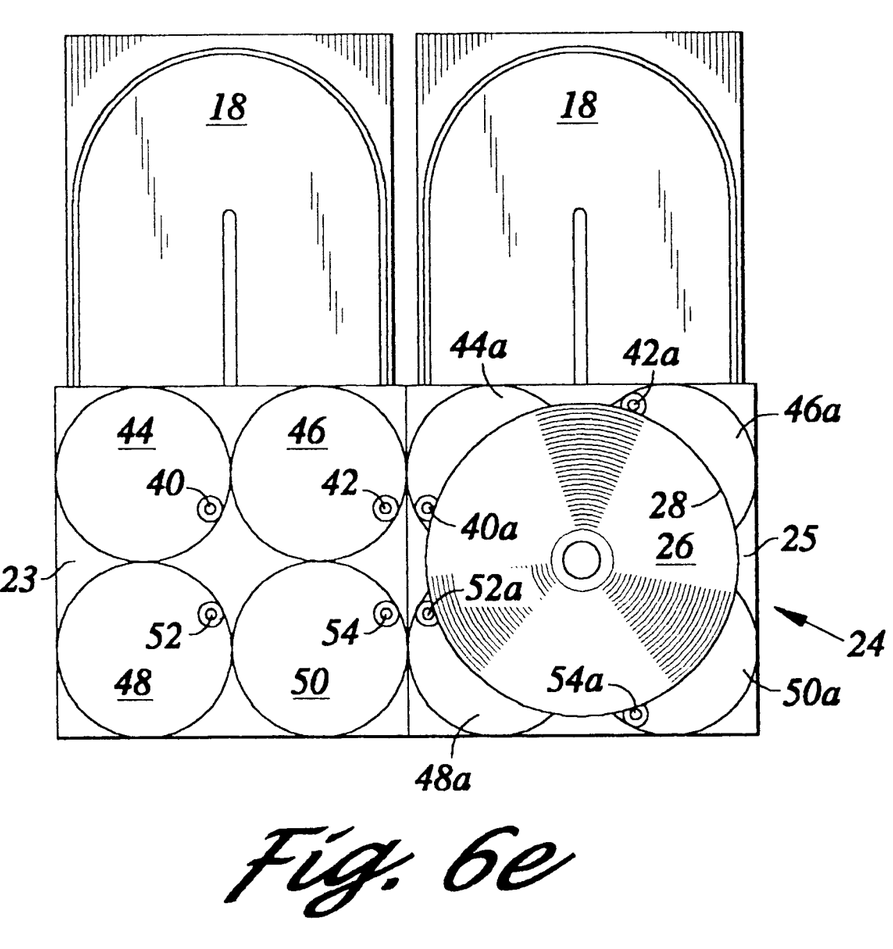

In exemplified operation, a disc 26 initially is moved outwardly from a shelf 18 by the disc movement mechanism of the shelf 18 toward the first disc transport position 23 of the loader and transport apparatus 24 positioned adjacent the shelf 18. The edge 28 of the disc 26 engages two rotating disc engager wheels 40, 42 (or 52, 54 if entering from the other side) while the disc movement mechanism of the shelf 18 continues to push the disc 26 from the shelf. The engaged rotating engager wheels 40, 42 move outwardly as the platforms 44, 46 (or 48, 50 if entering from the other side) are appropriately rotated. Once the disc 26 is over about 50% off of the shelf 18, the rotatable platforms 44a, 46a, 48a, 50a, whose respective engager wheels are frictionally engaged with the edge 28 of the disc 26, have full responsibility for moving the disc 26 to a transport position as shown in FIG. 6e. Once the transport position is reached, rotation of the platforms ceases. The loader and transport apparatus 24 may then travel through the access channel 16 to become adjacent a disc drive mechanism 20 in line with the shelf 18 from which the disc 26 was retrieved. At that time, rotation of the platforms 44a, 46a, 48a, 50a can commence to deliver the disc 26 to the drive mechanism. Conversely, the disc 26 can be moved to the other disc transport position 25 of the loader and transport apparatus 24 as described above for delivery to the drive mechanism not in line with the original storage shelf 18, or to another storage shelf 18 not in alignment with the original shelf 18. In like manner, a disc can be retrieved from a disc drive mechanism and delivered to a storage shelf of any storage bank 11, 12, 13, 14, as would be recognized by a skilled artisan. Lateral movement of a disc 26 from one transport position 23 or 25 to the other permits placement of such a disc 26 within storage shelves 18 adjacent each other or directly or indirectly opposing each other. As is apparent, delivery and/or retrieval of two discs 26 can occur simultaneously from and/or to adjacent sites, whether shelves 18 or drives mechanisms 20, to thereby enhance time-factor performance.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A compact disc loader and transport apparatus for a compact disc having a continuous peripheral edge, the loader and transport apparatus being usable in conjunction with at least two compact disc storage magazines and comprising:

a housing; and at least two disc transport units disposed within the housing, each of the disc transport units comprising:

a plurality of platforms rotatably mounted to the housing;

a plurality of motors each motor being mechanically coupled to one of the plurality of platforms; and a plurality of disc engagers, each disc engager being eccentrically rotatably mounted, above one of the platforms at the periphery thereof to rotate around the center of the platform, and being sized and configured to frictionally engage a portion the peripheral edge when the compact mounted;

the platforms of each of the disc transport units being arranged such that the independent rotation thereof by respective ones of the motors may be coordinated in a manner wherein the compact disc may be frictionally engaged by the disc engagers and selectively maneuvered back and forth between the disc transport units along a first axis and back and forth between either of the disc transport units and a respective one of the storage magazines along one of a second axis and a third axis which each extend in generally perpendicular relation to the first axis.

2. The compact disc loader and transport apparatus of claim 1 wherein each of the disc engagers comprises a roller having a generally V-shaped slot which extends about the periphery thereof and is adapted to engage a portion of the peripheral edge.

3. The compact disc loader and transport apparatus of claim 1 wherein each of the disc transport units comprises:

four platforms rotatably mounted to the housing in a generally square pattern; and four disc engagers which are rotatably mounted to respective ones of the platforms and engage the peripheral edge when the compact disc is fully advanced onto the disc transport unit of the loader and transport apparatus to which the disc engagers are mounted.

4. The compact disc loader and transport apparatus of claim 1 wherein:

the housing includes at least four openings formed therein for allowing for the movement of the compact disc into and out of engagement with the disc engagers of either of the disc transport units.

\* \* \* \* \*